United States Patent [19]

Tissot

[11] 4,245,249
[45] Jan. 13, 1981

[54] CONSUMER ELECTRONIC MALFUNCTION ALERTING SYSTEM

[76] Inventor: Pierre L. Tissot, 863 Via de la Paz, Pacific Palisades, Calif. 90272

[21] Appl. No.: 32,102

[22] Filed: Apr. 20, 1979

[51] Int. Cl.³ .................. H04N 5/64; H04N 7/02; G08B 21/00
[52] U.S. Cl. .................. 358/139; 340/635; 340/693; 455/347
[58] Field of Search .......... 340/635, 380, 381, 693; 358/139, 254; 325/355; 116/202; 455/347; 361/390, 422, 386

[56] References Cited

U.S. PATENT DOCUMENTS

| | | | |
|---|---|---|---|
| 1,673,876 | 6/1928 | Koeppler | 116/202 X |
| 2,062,259 | 11/1936 | Thomas | 116/202 X |
| 2,543,146 | 2/1951 | Bale | 358/254 |
| 2,947,811 | 8/1960 | Archer | 358/254 |

FOREIGN PATENT DOCUMENTS 7611817  11/1976  France ................. 358/139

*Primary Examiner*—John W. Caldwell, Sr.
*Assistant Examiner*—Daniel Myer
*Attorney, Agent, or Firm*—Ralph B. Pastoriza

[57] ABSTRACT

An electronic chassis supports a plurality of modules each provided with a small pin-point light such as a light emitting diode which will be energized only so long as the module is functioning. A back panel for the chassis in turn is provided with a plurality of observation openings respectively dimensioned and directed to be in line of sight alignment with the light emitting diodes on the plurality of modules. The arrangement is such that no ambiguity exists as to an opening and its associated module. Indentifying characters either numbers or letters are provided on the modules so that they can be visually distinguished from each other and corresponding identifying numbers or characters are provided on the back panel adjacent to the opening so that each opening has an identification corresponding to the identification of only that module whose light emitting diode is in the line of sight of the opening. A consumer can thus immediately observe through the openings which one or ones of the modules are mal-functioning by the absence of light and immediately identify such module by the identifying information adjacent to the opening on the panel from which no light is visible so that a new module can be ordered without having to remove the back panel until such time as the module is to be replaced.

4 Claims, 3 Drawing Figures

CONSUMER ELECTRONIC MALFUNCTION ALERTING SYSTEM

This invention relates generally to electronic apparatus and more particularly to an electronic malfunction alerting system for alerting consumers or lay persons of a malfunctioning part of the electronic apparatus all to the end that the consumer or lay person can himself order a replacement part.

BACKGROUND OF THE INVENTION

In theory, the repair of electronic apparatus or electronic circuits is simple; to wit, determine which part is bad or malfunctioning and simply replace it. In actual practice, what was once easy has become over the years difficult, expensive and unreliable. For example, there is involved either moving parts inventories to the defective electronic apparatus or moving the defective apparatus to an electronic workshop and back. Early proposals advocated the use of replaceable building blocks referred to as modules. However, the replacement of modules in present-day systems has to be carried out by trained electronic specialists and by persons having to carry large inventories of modules. Essentially, a "hit and miss" substitution method is undertaken all the while running the risk of carrying a bad module which was either improperly rebuilt or inadvertently replaced at one time.

As a result of the foregoing, the trend presently is to go back to the single, large, cheaply manufactured circuit board with its huge amount of soldered-in components. In other words, the trend is away from the expensive modular technology. This trend in turn nullifies the possibilities of efficient home repairs by even skilled repairers. Essentially, a consumer can do nothing service-wise under such circumstances.

BRIEF DESCRIPTION OF THE PRESENT INVENTION

In contrast to the foregoing situation, the present invention contemplates a consumer oriented electronic malfunction alerting system which will enable a consumer or lay person to determine from the outside of the electronic apparatus and prior to any dismantling of the apparatus which of several modules is malfunctioning and thus needs to be replaced. The consumer or lay person can thus first procure the needed module thereby avoiding the rotation of multitudes of modules.

In addition, and as a result of the foregoing, the feared pile-up of dismantled apparatuses in workshops is avoided, the latter situation resulting from "back ordered" parts. Moreover, even should the consumer or customer not wish to become involved in the actual repair work, the present invention still renders a most valuable service in that a meaningful diagnosis is readily provided to teach the actual serviceman what to bring with him.

Briefly, the foregoing features and advantages are realized in an electronic chassis supporting a plurality of modules, by providing a light emitting diode on each module connected to emit light only so long as the module is functioning. A back panel for the chassis has a plurality of openings respectively dimensioned and directed to be in line of sight alignment with the light emitting diodes on the plurality of modules so that no ambiguity exists as to an opening and its associated module. Identifying means in turn are provided on the module so that they can be visually distinguished from each other when removed and corresponding identifying means are provided on the back panel positioned adjacent to the openings, so that each opening has an identification corresponding to the identification of only that module whose light emitting diode is in the line of sight of the opening.

From the foregoing, it will be evident that a consumer or lay person can immediately observe through the openings in the back panel which one or ones of the modules are malfunctioning by the absence of light and immediately identify such module by the identifying means adjacent to the opening from which no light is visible. A new module can thus be ordered without having to remove the back panel until such time as the module is to be replaced.

In my copending U.S. Pat. application Ser. No. 935,487 filed Aug. 21, 1978, U.S. Pat. No. 4,190,879, and entitled CONSUMER SERVICEABLE ELECTRONIC SYSTEM, there is shown and described a modular exchange arrangement whereby a consumer can readily remove and replace a module without the necessity of any tools and also in a "foolproof" manner. In this respect, there is taught to consumers or lay persons the "how" of module exchange. The present application, in turn, essentially teaches the "which one" of the modules to be exchanged and wherein such detection of the proper module is possible without the necessity of a flashlight or the removal of the back panel.

Thus, the present application as well as my above-mentioned copending patent application both aim at the reintroduction of the lost art of the "radio tube-plug-in-principle".

BRIEF DESCRIPTION OF THE DRAWINGS

A better understanding as well as further features and advantages of this invention will be had by now referring to the accompanying drawings in which.

DETAILED DESCRIPTION OF THE PREFERRED EMBODIMENT

Figure 1:
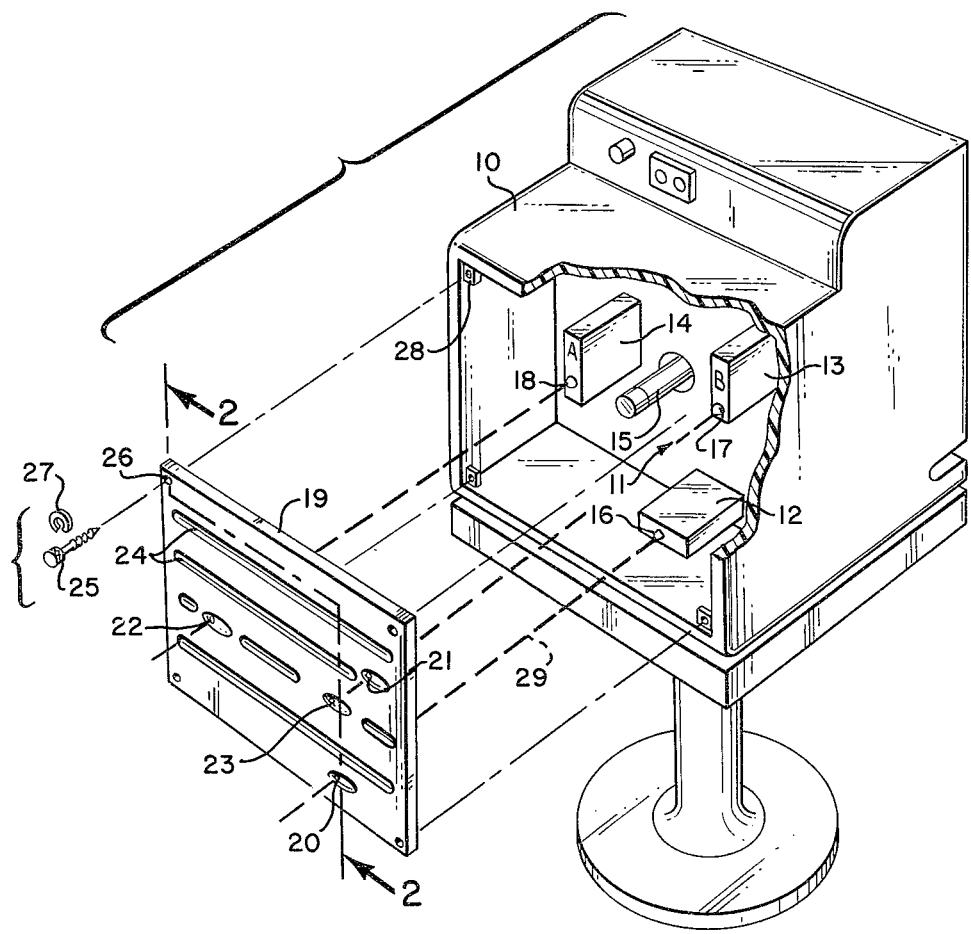
FIG. 1 is a broken away perspective view showing a television chassis with the back panel exploded away to reveal interior portions all designed in accord with the present invention.

Referring first to FIG. 1, there is shown by way of example of the present invention, a television receiver 10 including a basic electronic chassis 11. The chassis 11 supports a plurality of modules indicated at 12, 13 and 14. It will be understood that many more modules may be provided. Also illustrated for the television receiver 10 is the normal neck portion 15 of the television picture tube extending through a central opening in the chassis 11.

In accord with the present invention, a pin-point of light preferably in the form of a light emitting diode is provided on each module and interconnected with the module such that light will only be emitted from the light emitting diode so long as the module is functioning. Thus, the light emitting diodes may be provided on the extending end faces of the module such as indicated at 16, 17 and 18 for the three modules 12, 13 and 14 respectively.

The back panel for the television receiver 10 normally covering the back of the set is shown exploded away at 19 in FIG. 1. This back panel includes a plurality of openings indicated at 20, 21 and 22. These openings are respectively dimensioned and directed to be in line of sight alignment with the light emitting diodes 16, 17 and 18 on the plurality of modules when the back panel 19 is secured in place. The arrangement is such that no ambiguity exists as to an opening and its associated module. It will be understood that where more than three modules are utilized as would normally be the situation, a correspondingly greater number of openings would be provided.

Where the electronic apparatus constitutes a television receiver as depicted by way of example in FIG. 1, there is also provided a picture tube opening shown at 23 in the panel 19 of FIG. 1, the purpose for which will become clearer as the description proceeds.

Still referring to FIG. 1, the back panel 19 includes a plurality of horizontally extending ventilating slots 24 some of these slots being interrupted as shown where they are in horizontal alignment with one or more of the referred to openings such as the openings 21, 22 and 23. As will also become clearer as the description proceeds, these ventilating slots are so designed as to prevent any light from inside the television receiver from passing out through the slot opening so that the only light visible will be from modules as seen through the respective line of sight openings.

In the embodiment shown in FIG. 1, the back panel 19 is preferably secured to the rear of the television receiver 10 as by four corner nylon type screws, one of which is shown at 25 receivable in an opening 26 and held "captive" in the opening as by a "C" washer 27. By such arrangement, the nylon screw 25 will always be available for threading into an appropriate tapped hole 28 in the television receiver 10.

Figure 2:
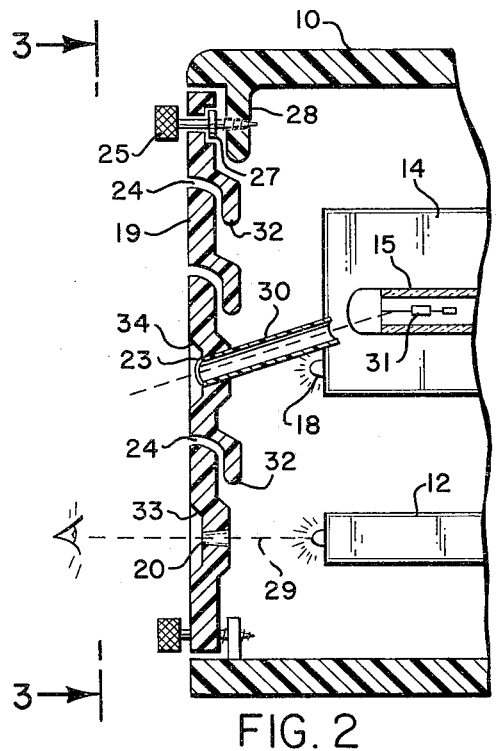
FIG. 2 is an enlarged fragmentary cross section of the panel when in assembled relationship on the electronic apparatus taken in the direction of the arrows 2—2 of FIG. 1; and, FIG. 3 is a fragmentary rear elevational view of the back panel looking in the direction of the arrows 3—3 of FIG. 2.

The foregoing will better be understood by reference to the upper portion of FIG. 2 wherein the "C" washer 27 is shown encircling the nylon screw 25 to hold it captive to the back panel 19 and yet permit rotation of the same for threading into the opening 28 to thereby secure the corner of the panel to the television set.

It will be understood that similar nylon type screws are provided for the other three corners, the same merely requiring manual tightening so that no special screwdrivers are necessary.

In both FIGS. 1 and 2 the line of sight arrangement for the light emitting diodes in the various openings are depicted by way of example by the dashed line 29 extending between the light emitting diode 16 for the module 12 and the opening 20. It can be seen by the schematic depiction of an eye in FIG. 2 that only the light emitting diode associated with the module 12 will be visible through the opening 20.

Also clearly shown in FIG. 2 is a sight tube 30 associated with the picture tube opening 23. This sight tube extends from the inside wall of the panel 19 and is angulated to be directed towards the cathode 31 visible in the neck portion 15 of the cathode ray picture tube. When the tube is operating normally, the cathode 31 radiates a dull red glow. The sight tube 30 will direct a person's eye positioned to peer into the opening 23 directly towards the cathode 31 so that no ambiguity exists as to the light source passing through the sight tube. Thus, advantage is taken of the natural glow indicating proper operation of the picture tube by means of providing the opening and sight tube in the back panel of this invention.

The various ventilating slot openings 24 are visible in FIG. 2 and it will be noted that each is provided with a downwardly extending lip portion 32 on the inside wall of the panel 19. These downwardly extending longitudinal lips 32 will block the emission of any light from the interior of the television set 10 through the ventilating slot to the outside so that the only light visible will be that from the modules as seen through the respective openings, all as mentioned heretofore.

In accord with further features of the present invention, each of the various openings is surrounded by a depressed area or cavity formed in the back panel to shield the same from ambient light. Such cavities are indicated at 33 and 34 for the respective openings 20 and 23 by way of example in FIG. 2.

Figure 3:
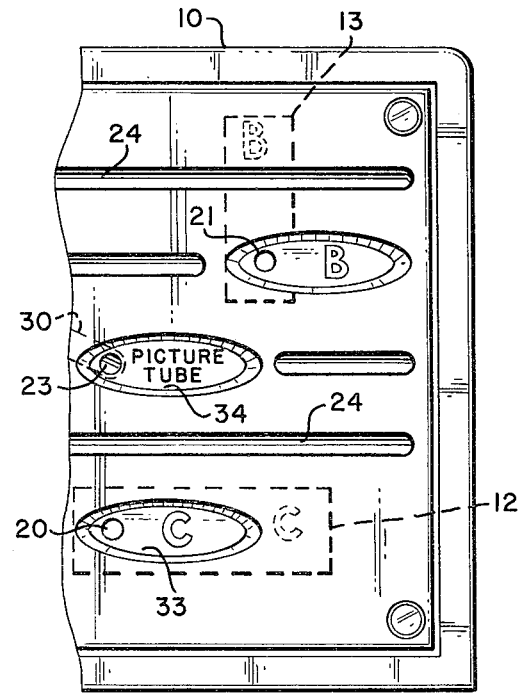

Referring to the rear elevational fragmentary view of FIG. 3, it will be noted that these cavities 33 and 34 are preferably oval in shape with the actual observation holes or openings 20 and 23 positioned towards one end of the oval openings to leave sufficient room for identifying information to be provided. In this respect, and in accord with an essential feature of this invention, identifying means are provided on each of the modules so that they can be visually distinguished when removed. For example, in FIG. 3, the modules 12 and 13 behind the panel are indicated in dashed lines wherein the letters "C" and "B" are marked on the modules themselves. Corresponding identifying means in the form of the letters "C" and "B" are provided adjacent to the openings 20 and 21 respectively so that each opening has an identification corresponding to the identification of only that module whose light emitting diode is in the line of sight of the opening.

The identification means in each instance is provided by luminescent material so as to be clearly visible. Further, the identifying means on the panel adjacent to the sighting opening is also within the surrounding cavity so as to be shielded from ambient light and thus clearly visible because of its own luminescence.

For the particular opening 23 and sighting tube 30 associated with the picture tube, there need not be provided any particular identifying means other than the nomenclature "PICTURE TUBE" written in luminescent material in the cavity 34.

OPERATION

When the electronic apparatus such as the television receiver described in FIG. 1 is operating normally, all of the various light emitting diodes associated with the plurality of modules will be visible through the corresponding line of sight openings in the back panel 19 when the panel 19 is in position. Monitoring of the picture tube itself can readily take place by simply positioning the eye adjacent to the opening 23 and sighting down the sighting tube 30 to observe whether or not the cathode is glowing.

Should a malfunction occur in the set, the consumer or lay person need only observe the various sighting openings through the rear panel 19 to the interior of the set and can immediately determine which one or ones of the various modules is malfunctioning by the absence of light through the corresponding opening.

The consumer in observing those openings through which no light is passing will note the identifying letters or other characters corresponding to the particular modules that do not emit light and can then order these parts without even having to remove the back panel.

Alternatively, the consumer can simply call up a repair man and tell the repair man which modules need to be replaced so that when the repair man arrives he can bring the correct modules with him.

However, the present invention makes diagnosis so simple and coupled with the teachings of my heretofore referred to prior application the substitution of modules is so simple that a lay person or consumer himself can readily obtain the new modules, remove the back panel and replace the defunct modules.

With respect to the foregoing, once the back panel is removed, the interlock system removes power from the television chassis so that none of the light emitting diodes on the modules will be energized. However, the malfunctioning module has previously already been identified and since each module is marked with luminescent material indicating its code, it is readily identifiable and replaceable.

As already mentioned heretofore, where the electronic apparatus utilizes a cathode ray tube as in the example set forth for a television receiver, a natural malfunction read-out light already exists in the red-glowing cathode of the cathode ray tube. In this present invention, a consumer is invited to check the cathode glow of the picture tube in normal operation by utilizing the simple sighting tube 30 described in FIG. 2 in cooperation with the back panel observation opening 23.

From all of the foregoing, it will thus be evident that the present invention has provided a consumer electronic malfunction alerting system which works admirably in conjunction with my heretofore mentioned copending patent application describing consumer serviceable electronic systems generally.

I claim:

1. A consumer electronic malfunction alerting system for an electronic chassis supporting a plurality of modules, including, in combination:
   (a) a light emitting diode on each module connected to emit light only so long as said module is functioning;
   (b) a back panel for said chassis having a plurality of openings respectively dimensioned and directed to the line of sight alignment with only the light emitting diode on said plurality of modules so that no ambiguity exists as to an opening and its associated module;
   (c) identifying means on said module so that they can be visually distinguished when removed; and
   (d) corresponding identifying means on said back panel positioned adjacent to said openings so that each opening has an identification corresponding to the identification of only that module whose light emitting diode is in the line of sight of said opening, whereby a consumer can immediately observe through said openings which one or ones of said modules are functioning by the absence of light and immediately identify such module by said identifying means on said back panel adjacent to the opening from which no light is visible so that a new module can be ordered without having to remove said back panel until such time as such module is to be replaced.

2. A system according to claim 1, in which said back panel is formed with cavities surrounding said openings and the corresponding identifying means so that the openings and edentifying means are shielded from ambient light, said identifying means comprising luminescent material so as to be readily visible and the corresponding identifying means on the associated module comprising luminescent material so it can be readily identified after the back panel is removed to replace the module.

3. A system according to claim 1, in which said back panel includes a plurality of horizontally extending ventilating slots, some of said slots being interrupted where they are in horizontal alignment with one or more of said openings, each of said slots including an inwardly and downwardly extending lip on the inside of the panel to block light inside the panel from passing out the back of the panel through the ventilating slot so that the only light visible is from said modules as seen through the respective line of sight openings.

4. A system according to claim 1, in which said chassis is for a television receiver having a picture tube neck portion passing through the chassis towards said panel, said panel including a picture tube opening; and a sight tube extending from said opening on the inside wall of said panel in an angulated direction towards the cathode of the picture tube for said television receiver so that a consumer's eye is directed towards the cathode to enable a quick determination to be made as to whether the picture tube is operative.

* * * * *